United States Patent [19]

Podrazhansky et al.

[11] Patent Number: 5,307,000
[45] Date of Patent: Apr. 26, 1994

[54] METHOD AND APPARATUS FOR CHARGING, THAWING, AND FORMATTING A BATTERY

[75] Inventors: Yury Podrazhansky; Phillip W. Popp, both of Norcross, Ga.

[73] Assignee: Electronic Power Technology, Inc., Norcross, Ga.

[21] Appl. No.: 824,113

[22] Filed: Jan. 22, 1992

[51] Int. Cl.$^5$ ............................................... H02J 7/10
[52] U.S. Cl. ........................................ 320/14; 320/21
[58] Field of Search ............................. 320/14, 21, 20

[56] References Cited

U.S. PATENT DOCUMENTS

| | | | |
|---|---|---|---|
| 3,597,673 | 8/1971 | Burkett et al. | 320/5 |
| 3,614,583 | 10/1971 | Burkett et al. | 320/5 |
| 3,617,851 | 11/1971 | Du Puy et al. | 320/22 |
| 3,683,256 | 8/1972 | Mas | 320/14 |
| 4,211,969 | 7/1980 | Steigerwald | 320/14 |
| 4,253,054 | 2/1981 | Steigerwald | 320/14 |
| 4,385,269 | 5/1983 | Aspinwall et al. | 320/14 |
| 4,730,153 | 3/1988 | Breting et al. | 320/14 |
| 4,731,573 | 3/1988 | Sexton et al. | 320/14 |
| 4,740,739 | 4/1988 | Quammen et al. | 320/14 |
| 4,746,852 | 5/1988 | Martin | 320/20 |
| 4,829,225 | 5/1989 | Podrazhansky et al. | 320/14 |
| 4,878,007 | 10/1989 | Gábor et al. | 320/14 |

FOREIGN PATENT DOCUMENTS 0445089 3/1975 U.S.S.R. ................................. 320/13

OTHER PUBLICATIONS

Integrated Circuit Systems, Inc. ICS 1700 Preliminary, "Rapid Charge Controller for Nickel-Cadmium Batteries".

Primary Examiner—R. J. Hickey
Attorney, Agent, or Firm—Jones & Askew

[57] ABSTRACT

A method and an apparatus for rapidly charging a battery. The preferred charging method comprises applying one or more charging pulses (C1, C2), separated by a waiting period (CW1), with the last charging pulse, if there are more than one, being followed by a second waiting period (CW2). This is then followed by a series of discharging pulses (D1, D2, D3), which are separated by waiting periods (DW1, DW2), and followed by a last waiting period (DW3) before the occurrence of the next charging pulse (C1). The discharging pulses preferably have a magnitude which is approximately the same as the magnitude of the charging pulses but which have a duration which is substantially smaller than the duration of the charging pulses. The discharging pulses serve to create and disperse ions throughout the electrolyte of the battery so that the ions do not shield the plates of the battery from further charge transfer. Multiple discharge pulses are used rather than a single discharging pulse so that natural chemical and electrical gradients within the battery will serve to disperse the ions more evenly throughout the electrolyte. The use of discharging pulses of an extremely small duration does not cause any significant discharge of the battery but does increase the rate at which the battery can be charged and the efficiency with which the battery can be charged, thereby minimizing charging time and battery heating. Also disclosed are a method and an apparatus for thawing and charging a frozen battery, for formatting a new battery, for determining the state of formation of a battery, and for determining the state of charge of a battery.

58 Claims, 4 Drawing Sheets

Fig — 1

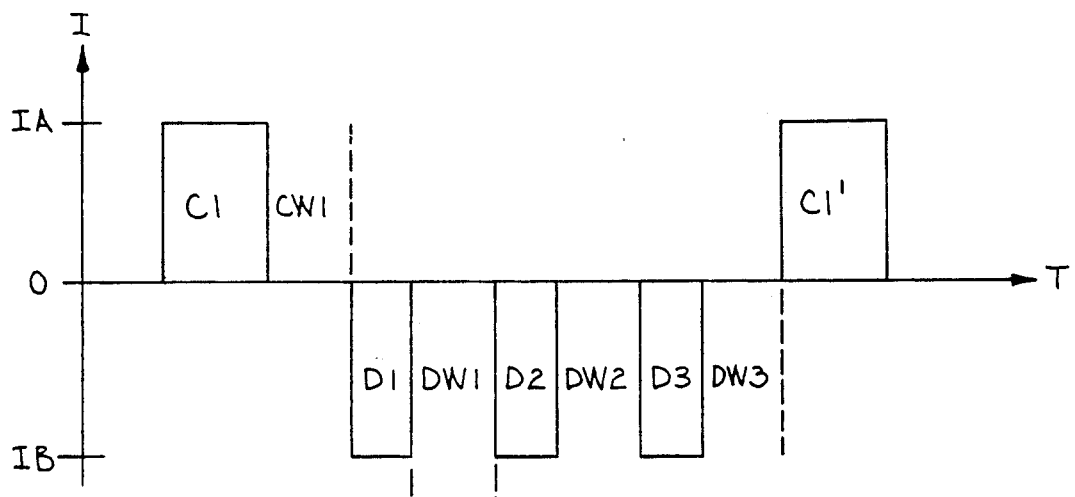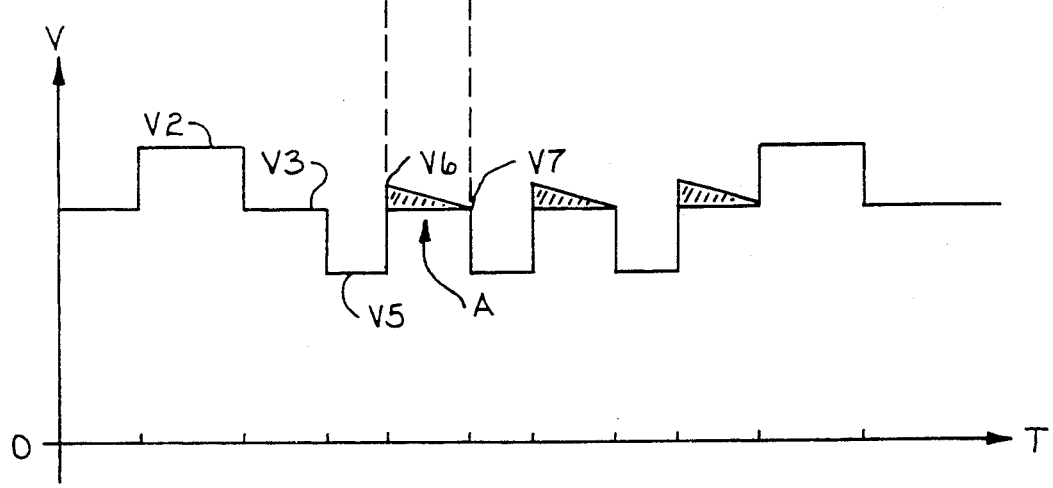
Fig-3

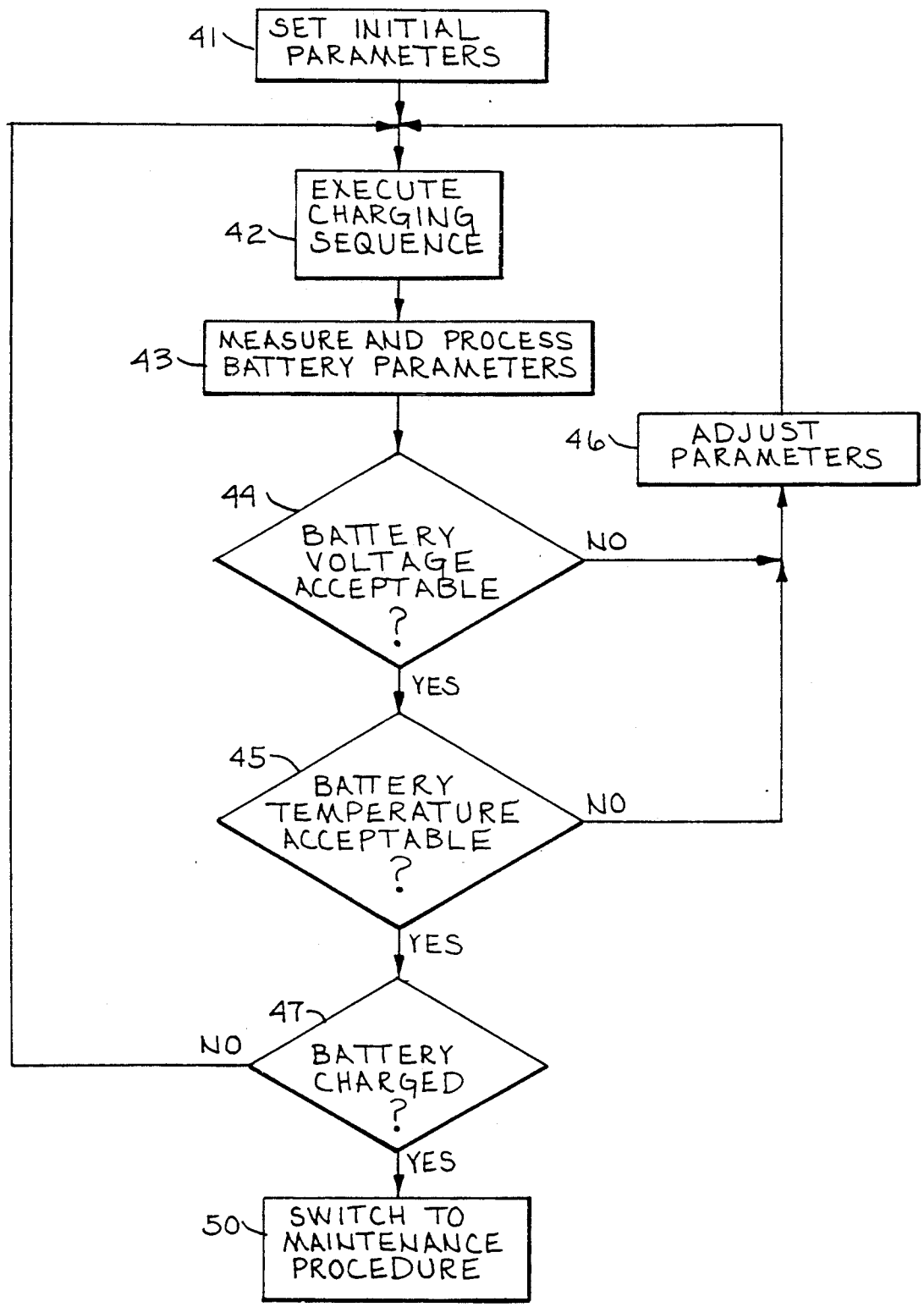

METHOD AND APPARATUS FOR CHARGING, THAWING, AND FORMATTING A BATTERY

TECHNICAL FIELD

The present invention relates to battery chargers and, more particularly, discloses a method and an apparatus for rapidly charging a battery, rapidly charging a frozen battery, rapidly formatting a battery, determining the state of formation of a battery, and determining the state of the charge of a battery.

BACKGROUND OF THE INVENTION

The general technique of recharging a battery is well known: forcing a current into the battery. However, this technique, while simple, can cause excessive heating of the battery, excessive gassing, and require a prolonged time to fully recharge the battery. The time required to recharge a battery can be reduced by applying a depolarizing (discharging) pulse between charging pulses, as is disclosed in U.S. Pat. No. 3,597,673 to Burkett et al. A further reduction in the charging time and in the heating of the battery can be obtained by waiting for a specified period after the end of the discharge pulse before applying the next charging pulse. This technique is disclosed in U.S. Pat. No. 4,829,225 to Podrazhansky et al. However, it is desirable to further reduce the battery heating and the charging time.

A rechargeable battery, once discharged, requires recharging to restore energy to the battery. Several hours, or more, are typically required to recharge a battery because a conventional battery charger cannot deliver a high charging current without causing overheating of the battery. As is well known, overheating a battery dramatically reduces the life of the battery. Therefore, there is a need for a battery charger which can quickly recharge a battery by providing a high charging current in a manner which does not overheat the battery.

When a battery is charged, internal resistance is created within the battery by the creation of a diffusion layer which results from the migration of positive ions to the negative plate and the migration of negative ions to the positive plate. This diffusion layer, sometimes called a Duffney layer, is not easy to break and creates a higher internal resistance to the flow of ions. When a battery is frozen, this internal resistance is further increased due to the decreased velocity of the ions. This high internal resistance makes it virtually impossible to charge a frozen battery. Therefore, charging a frozen battery by using direct current is extremely difficult and takes an extended period of time. It is therefore desirable to reduce the charging time of a frozen battery.

With specific types of batteries, such as lead acid batteries, the state of the charge can be determined by simply measuring the battery voltage. In particular, the battery voltage will rise until the battery is fully charged, and then the battery voltage will drop. In lead acid batteries the drop is readily detectable. Therefore, charging systems can determine when to terminate charging based on this change in voltage and avoid unnecessary energy consumption and damage to the battery. In some other types of batteries however, the drop is so small it can be easily masked by noise or normal variations in battery voltage. With some battery types, such as NiCad and NiFe, there is not a known indicator which can be utilized to determine the state of the charge. Therefore, conventional battery charging systems are unable to determine the optimum point to terminate charging. Therefore, there is a need to determine the state of the charge for NiCad and NiFe as well as other battery types in order to avoid unnecessary energy consumption and damage to the battery.

A newly constructed battery requires formatting (charging). Depending on the type and size of the battery, this may require 12 hours to several days. The electrolyte is placed in the battery and some electrolyte is absorbed by the plates. The initial chemical reaction generates a great deal of heat and the battery temperature may easily reach 170° F. Once the electrolyte is absorbed by the plates, the temperature will begin to fall, thereby indicating that the absorption (pickling) time is over and the battery is ready for formation. An electrolyte temperature of 135° F. to 145° F. is desirable for battery formation. A high charging current is desired in order to reduce the formation time. However, the charging current should not be greater than that required to maintain the desired battery temperature or overheating of and damage to the battery may result. Therefore, there is a need for a battery charger which provides a charging current which minimizes the formation time without overheating the battery.

There is no known method of determining the state of formation of the battery. This inability to determine the state of formation of the battery makes it difficult to determine the optimum point for terminating formation of the battery. Therefore, in order to assure that a battery has been formatted, a battery is typically charged for a fixed amount of time. However, this generally causes overcharging of the battery, wastes energy, causes gassing due to electrolysis of the water, and prolongs the formatting time. If a short time is used, so that gassing does not occur, the battery may not be completely formatted or charged. Therefore, there is a need to determine the state of formation of the battery in order to insure that the battery is completely formatted, in order to avoid unnecessary energy consumption, and in order to reduce the time for the formation process.

SUMMARY OF THE INVENTION

The present invention provides a method and an apparatus for rapidly charging a battery, rapidly charging a frozen battery, rapidly formatting a battery, determining the state of formation of a battery, and determining the state of charge of a battery. For charging a battery, the present invention contemplates applying a charging pulse or a series of charging pulses to the battery, applying a series of depolarizing (discharging) pulses to the battery, the pulses being separated by wait periods, and repeating the charge and discharge procedures until the battery is completely charged. The discharging pulses are created by applying a load to the battery. The discharging pulses are typically of significantly shorter duration than the duration of the charging pulse. The interposed wait periods may be of the same duration or of different durations and may be of a different value than the duration of the discharging pulses. The application of a charging pulse or a series of charging pulses, followed by a plurality of discharging pulses, the pulse being separated by wait periods, provides for a very rapid charging and minimal heating of the battery.

The application of multiple discharging pulses, separated by wait periods, causes the creation of more available ions than a single discharging pulse. The charging pulse will generally make use of all available ions and therefore more ions allows more charging current to be applied. The heating of the battery is also minimized as the internal resistance of the battery is decreased by the increased availability of ions.

Therefore, it is an object of the present invention to provide a method and an apparatus for rapidly recharging a battery while minimizing heating of the battery.

The present invention further provides a method and an apparatus for rapidly charging a frozen battery. The present invention contemplates applying one or more of charging pulses, followed by one or more of discharging pulses, with wait periods separating the pulses, and repeating the charging and discharging process until the battery thaws and becomes fully charged. As the charging and discharging pulses are applied to the battery, the battery will thaw because of the water produced and the heat producing chemical reactions occurring within the battery.

Therefore, it is another object of the present invention to provide a method and an apparatus for rapidly thawing and charging a frozen battery.

Because of the high currents involved in a rapid charging process, overcharging a battery may quickly result in damage to the battery. The present invention therefore provides a method and an apparatus for determining the state of charge of a battery. The area under the open circuit output voltage curve is measured after a discharging pulse. This area will reach a steady state value once the battery becomes charged. This area is therefore used to determine when to terminate the rapid charging process.

Therefore, it is another object of the present invention to determine the state of the charge of a battery.

The present invention also provides a method and an apparatus for rapidly formatting a new battery. For formatting a battery, the present invention contemplates applying a charging pulse or a series of charging pulses, followed by a series of discharging pulses, with wait periods separating the plurality of discharging and charging pulses, and repeating this procedure until the battery is completely charged. The duration, number and magnitude of the charging pulses is controlled in order to maintain the temperature of the electrolyte within a temperature range determined to be optimum for battery formation. This temperature control is necessary due to the various heat producing chemical reactions which occur during the formation process and due to changes in the internal resistance of the battery during the charging process.

Therefore, it is another object of the present invention to provide a method and an apparatus for rapidly formatting a new battery.

The present invention also provides a method and an apparatus for determining the state of formation of a battery. During the formation process, voltage spikes will appear on the voltage waveform at the beginning of the charging pulses and at the beginning of the discharging pulses. The magnitude of the spikes are an indication of the state of conversion (formatting) of the material at the positive and negative plates. The voltage spikes at the beginning of the charging pulses will reach maximum, steady state values when the material is fully converted at the negative plate, and the voltage spikes at the beginning of the discharging pulses will reach maximum values when the material is fully converted at the positive plate.

Therefore, it is another object of the present invention to determine the state of formation of a battery.

BRIEF DESCRIPTION OF THE DRAWING

FIG. 3 is a waveform which illustrates how the state of the charge of the battery is determined.

FIG. 5 is a flowchart of the battery charging process implemented by the controller.

DETAILED DESCRIPTION

Figure 1:
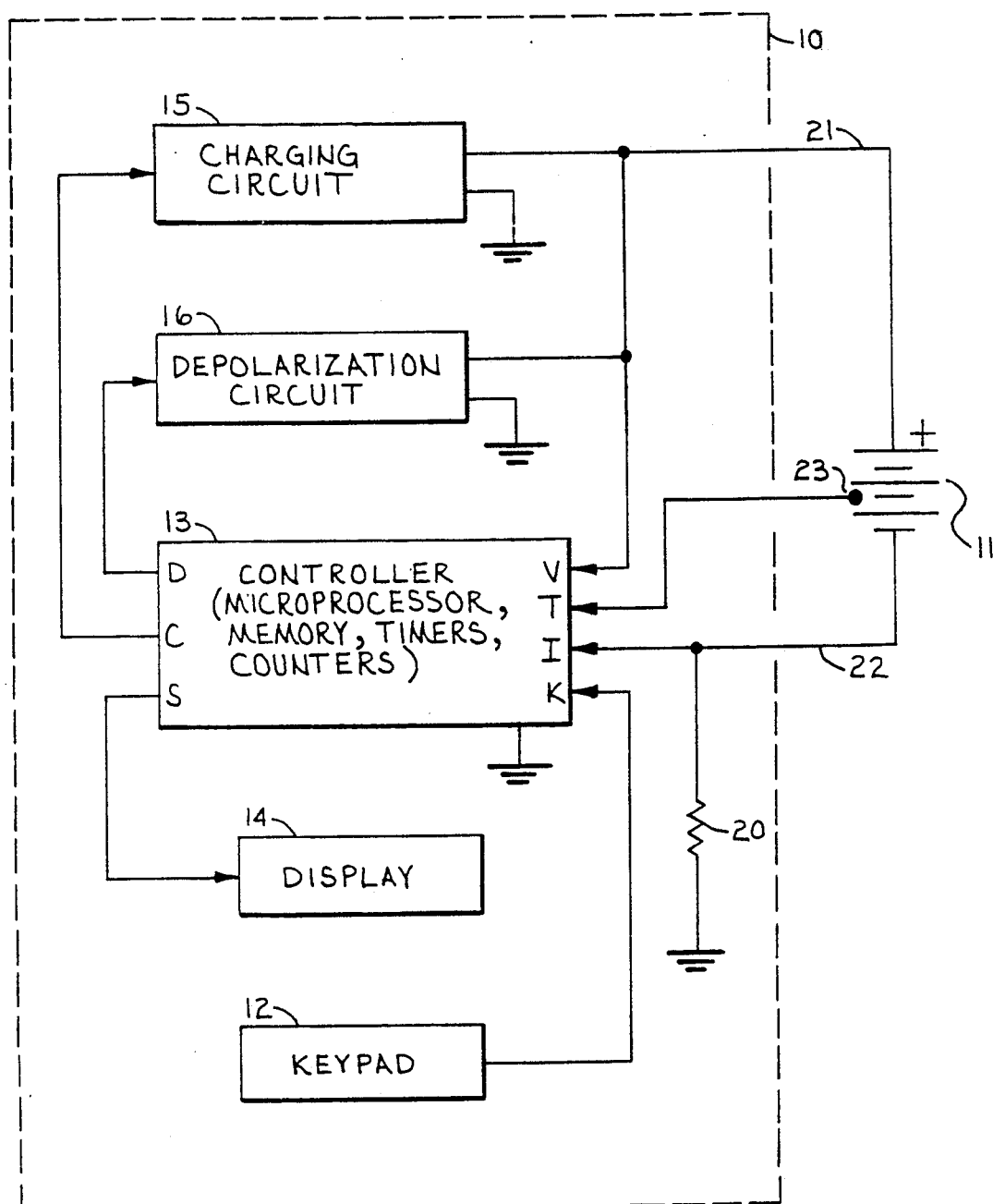
FIG. 1 is a block diagram of the preferred embodiment of the present invention.

Turning now to the drawing, FIG. 1 is a block diagram of the preferred embodiment of the present invention. The battery charging, discharging, and thawing circuit 10 comprises a keypad 12, a controller 13, a display 14, a charging circuit 15, a depolarization (discharging) circuit 16, and a current monitoring circuit 20. Keypad 12 is connected to the "K" input of controller 13 and allows the user to input specified parameters such as the battery type (lead acid, NiCad, NiFe, etc.), and other relevant information, such as a nominal battery voltage or number of cells in series. Keypad 12 may be a keyboard, dial pad, array of switches, or other device for entering information. To simplify operation by the user, controller 13 may be preprogrammed with the parameters for a plurality of battery types. In this case the user would simply enter a battery type, such as a model number, and controller 13 would automatically use the parameters appropriate for that battery type. Display 14 is connected to the "S" output of controller 13 and displays the information, choices, parameters, etc., for the operator.

The "C" output of controller 13 is connected to charging circuit 15. Charging circuit 15 provides a charging current to the battery 11. Depending upon the application, charging circuit 15 may be configured by controller 13 to perform as a constant voltage source or a constant current source. The "D" output of controller 13 is connected to depolarization circuit 16, which may be configured by controller 13 to provide a constant depolarization current or apply a selected load to the battery. The pulse width of the pulses provided by circuits 15 and 16 are controlled by controller 13. The output of charging circuit 15 and the output of depolarization circuit 16 are connected to the positive terminal of battery 11 via conductor 21. The negative terminal of battery 11 is connected to circuit ground through a resistor 20, which has a nominal value of 0.01 ohm. Current flowing into or out of battery 11 must pass through resistor 20. The current through battery 11 may therefore be determined by measuring the voltage across resistor 20 on conductor 22. Resistor 20 therefore functions as a current monitor and also functions as a current limiter. Of course, other devices, such as Hall effect devices, may be used to determine battery current.

Battery voltage is monitored by measuring the voltage between conductor 21 and circuit ground. The effects of resistor 20 may be eliminated by measuring the voltage between conductors 21 and 22, or by subtracting the voltage on conductor 22 from the voltage on conductor 21. Conductors 21 and 22 are connected to the V and I input, respectively, of controller 13. It will be appreciated that if controller 13 is a logic device, such as a microprocessor, then the signals must be converted to a form usable by controller 13, such as by an analog-to-digital converter.

Battery presence may be determined by activating charging circuit 15 and monitoring the output of current monitor 20 to determine if a charge current is flowing, by activating depolarization circuit 16 and monitoring the output of current monitor 20 to determine if a discharge current is flowing, by deactivating both charging circuit 15 and depolarization circuit 16 and monitoring the voltage to determine if a battery is present, etc.

Temperature sensor 23 monitors the temperature of battery 11 so that controller 13 can adjust the magnitude, number and duration of the charging current pulses and the depolarization (discharging) current pulses, and the duration of the rest periods, in order to maintain the desired battery temperature. Sensor 23 may be a snap action device, such as a thermostat, or an analog device, such as a thermistor or a thermocouple. It is preferable that sensor 23 be immersed in the electrolyte of one of the cells of battery 11 so as to accurately report the internal battery temperature. Temperature sensor 23 is converted to the "T" input of controller 13. The inner cells of a battery typically are hotter than the outer cells because the outer cells are better able to transfer heat to the surrounding atmosphere or structure. Therefore, although only a single device 23 is shown, it is preferred that a separate temperature sensor be used for each cell of battery 11.

In the preferred embodiment controller 13 comprises a microprocessor, a memory, at least part of which contains operating instructions for controller 13, timers, and counters. The timers, which may be discrete devices or a part of the microprocessor, may be used for controlling the charging pulse duration, the discharging pulse duration or the wait period duration, measuring the duration of a voltage spike or a current spike, etc. The counters, which are typically embodied in or implemented by the microprocessor, are used for integrating the charging current so as to provide an indication of the total charge provided to the battery and integrating the discharge current so as to provide an indication of the charge taken from the battery.

Figure 2:
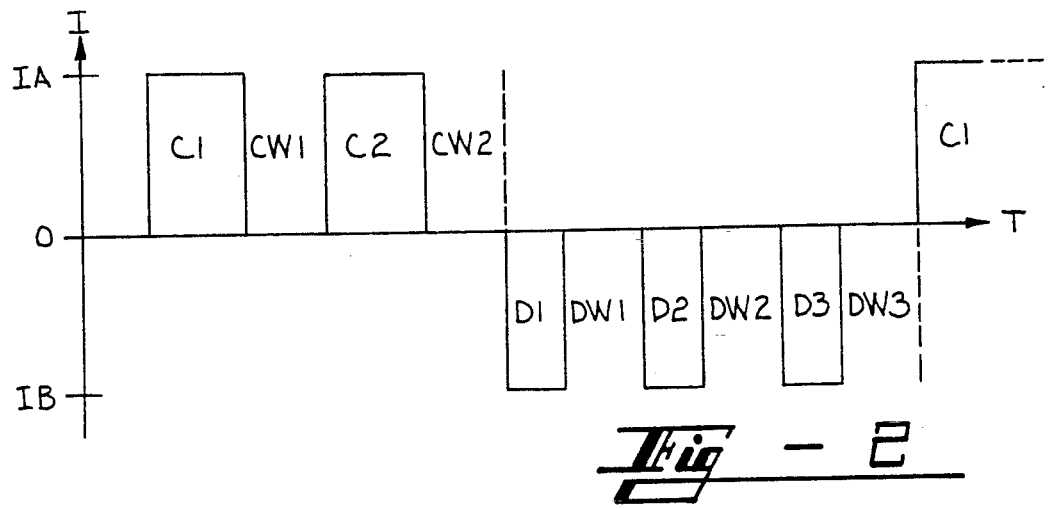
FIG. 2 is an illustration of the charging pulse/waiting period/discharging pulse/waiting period process.

FIG. 2 is an illustration of the charging pulse/waiting period/discharging pulse/waiting period process. The apparatus of FIG. 1 may be used therefor. For convenience of illustration the charge pulses and discharge pulses are illustrated as rectangular pulses but it will be appreciated that this is frequently not the case in actual practice and therefore the present invention should be understood as including but not requiring the use of such rectangular waveforms. Also, the charging pulses C1 and C2 are shown as having the same pulse width and the same current amplitude, IA, for convenience and not as an indication of any limitation. If desired, pulses may have different current amplitudes, and may vary during a charging pulse. In addition, the current amplitude for charging pulses C1 and C2 may vary during the charging cycle based on monitored changes to the battery temperature, the battery voltage, and the state of charge or formation of the battery. Likewise, the discharging pulses, D1 through D3 are shown as having the same pulse width and the same, constant discharge current amplitude, IB, for convenience and not by way of limitation. If desired, pulses may have different current amplitudes, and the current may vary during a discharging pulse. In addition, the current amplitude for discharging pulses D1 through D3 may vary during the charging cycle based on monitored changes to the battery temperature, the battery voltage, and the state of charge or formation of the battery. The number of the discharging pulses shown is purely for convenience and not by way of limitation. Likewise, wait periods, CW1, CW2, and DW1-DW3, are shown as having the same duration for convenience and not by way of limitation. A wait period may only be of a duration required by circuits 15 or 16 to alter the amplitude of the charging or discharging current. In addition, the duration of the individual wait periods may vary during the charging cycle based on monitored changes in the state of the battery.

In the preferred mode of operation of the present invention, controller 13 would cause one charge pulse, for example, charging pulse C1, to be applied to the battery, followed by a wait period CW1. After the first wait period CW1 a series of discharging pulses D1, D2, D3, separated by waiting periods DW1 and DW2 and followed by a wait period DW3, would be applied to the battery. At the end of the last wait period DW3 the process would be repeated, that is, another charging pulse C1 would be applied to the battery, followed again by a first wait period CW1, etc. The duration of the charging pulses, discharging pulses, and wait periods (also called rest periods) are dependent upon the type of battery being recharged. For a lead acid battery, the charge pulse C1 may have a duration of 1/10 second to several seconds. However, the duration of each discharging pulse D1, D2, D3 will be significantly shorter than the duration of the charging pulse. In the preferred mode of operation, the total duration of the discharging pulses (D1+D2+D3) should be in the range of 0.05 percent to 2 percent of the duration of the charging pulse C1. The total duration of the discharging pulses may be longer for some types of batteries. If the total duration of the discharging pulses is excessive, then the discharging pulses will cause some energy to be removed from the battery and therefore increase the overall charging time. It is preferred that the magnitude IB of the discharging pulses be of at least the same magnitude IA of the charging pulse.

For lead acid batteries, during the charging pulse, crystals of lead (Pb) and lead peroxide ($PbO_2$) will grow on the plates. Smaller size crystals are preferred because this creates a greater battery plate surface, thereby lowering the impedance of the battery and reducing memory effects. Short duration charging pulses are preferred because this produces the smaller size crystals with no sharp edges. The discharge current tends to remove sharp edges on a crystal in preference to the rest of the crystal. Therefore, it is possible to obtain the preferred smaller size crystals, even with a longer duration charging pulse, by setting the magnitude IB of the discharging pulses to the greater than or equal to the magnitude IA of the charging pulses. If current magnitude IB is less than current magnitude IA, then the duration of the charging pulses should be reduced in order to minimize crystal size and sharp edges on the crystals so that there will be fewer sharp edges for the reduced discharge current to remove.

Similar effects on crystal formation occur with other battery types such as NiCad and NiFe; the crystals are NiOOH and Ni for NiCad batteries, and Fe and FeOOH for NiFe batteries.

FIG. 2 also illustrates that multiple charging pulses C1 and C2 may be used. In this case a first wait period CW1 is interposed between the two charging pulses C1 and C2, and a second waiting period CW2 is preferably interposed between charging pulse C2 and discharging pulse D1. However, if multiple charging pulses C1, C2, etc., are used, then the duration of each charging pulse and the total duration of the charging pulses should be selected, in conjunction with the duration and number of the discharging pulses, so as to obtain the desired crystal size and minimize the formation of sharp edges on the crystals.

The number of discharging pulses in the series of discharging pulses is a function of the specific parameters of the battery. The duration and number of the discharging pulses should be selected so as to maximize the availability of ions, obtain the desired crystal size, and minimize the formation of sharp edges on the crystals. The duration of the wait periods preceding the discharge pulses, interposed between the discharge pulses, and following the discharge pulses should be selected to maximize the availability of ions. The duration of an individual wait period may be as short as the duration required for circuits 15 or 16 to alter the amplitude of the charging or discharging current.

As the battery becomes charged, the water in the electrolyte is used in the chemical reactions, thereby increasing the concentration of the acid in the electrolyte and decreasing the ions available. The discharge pulse creates additional ions which decreases the internal resistance of the battery. During the discharge pulse, the negative plate of the battery discharges faster than the positive plate in that the chemical reactions which occur at the negative plate are faster than the reactions which occur at the positive plate. Therefore, during the discharging pulse, the discharge chemical reactions occur primarily at the negative plate and produce water which mixes with the electrolyte, thereby producing ions which are available for the charging reactions. The wait periods separating the discharging pulses are necessary to provide time for the water to mix with the electrolyte and for reactions to occur which produce available ions. The duration of the wait period is selected to provide sufficient time for the water to mix with the electrolyte without unnecessarily delaying the charging of the battery.

When charging current is applied to battery 11, the lead sulfate of the plates disassociates into lead ions and sulfate ions. In addition, the current separates the water into hydrogen ions and hydroxide (OH) ions. Positively charged ions move toward the negative plate and negatively charged ions move toward the positive plate. The accumulation of ions around a plate tends to shield the plate and suppress the further movement of ions until the earlier created ions have had a chance to move away from the plate. The discharging (depolarizing) pulse serves to force ions away from the immediate vicinity of a plate so that newly created ions can more readily move towards the plates. The wait period after a discharging pulse allows the ions to drift and move toward their natural positions between the plates, driven solely by the gradients caused by different chemical and charge concentrations in the electrolyte solution. Multiple discharging pulses serves to further eliminate the shielding effect of ions in the immediate vicinity of a plate. This allows the next charging pulse to create large numbers of ions with minimal shielding effects from the ions produced on the previous charging pulse.

For a lead acid battery, using a single charging pulse and multiple discharging pulses, typical parameters are as follows: charging pulse C1 has a current value IA of 50 amps and a pulse duration of 250 msec; waiting period CW1 has a duration of 1 msec; discharging pulses D1, D2 and D3 each have a current value IB of 50 amps and a pulse duration of 1 msec; waiting periods DW1 and DW2 each have a duration of 2 msec; and waiting period DW3 has a duration of 6 msec.

When a battery, such as a lead acid battery, becomes frozen due to exposure to weather conditions the internal resistance of the battery increases due to the decreased velocity of ions. Therefore, the possibility of charging by application of a direct current is minimal. Furthermore, if the positive ions have migrated to the negative plate and the negative ions have migrated to the positive plate, a diffusion layer is created which is very difficult to break and which makes it very difficult to charge the battery. However, a high discharge current will cause a diffusion layer to break up and the waiting period allows time for these ions to migrate away from the plates so that the plates will more readily accept a high charging current pulse. The waveform used for charging a frozen battery is that shown in FIG. 2. That is, one or more charging pulses C1, C2 separated and followed by wait periods CW1, CW2, followed by discharging pulses D1, D2, D3 which are also separated and followed by waiting periods DW1, DW2, DW3.

The application of a discharging pulse creates water by the chemical reactions. The water mixing with the acid generates heat. The application of a charging pulse also generates heat. The heat generated serves to thaw the battery, thereby lowering the internal resistance of the battery. Therefore, the battery can accept a larger charging current, which leads to the rapid charging and thawing of the battery.

A comparison has been made between the ability to charge a frozen battery using a conventional charger and the ability to charge a frozen battery using the present invention. For a battery at 0° F., the battery would accept 0.3 amps of charging current from the conventional battery charger. For a battery at 0° F., using the present invention, and applying successive repetitions of a single charging pulse and a single discharging pulse, the charging current was started at 6 amps and gradually increased up to 35 amps as the battery became thawed and would more readily accept the charge. For a frozen battery at 0° F., using the charge/multiple discharge technique of the present invention, the charging current started at 40 amps and gradually increased to 60 amps as the battery became thawed and could more readily accept the charging current. Using the charge/multiple discharge technique of the present invention, a frozen battery was thawed and readily accepting charging current within six minutes.

For a lead acid battery, typical initial values for the waveform of FIG. 2 are: charging pulse C1 has current value IA of 35 amps and a duration of 250 msec; wait period CW1 has a duration of 2 msec; discharging pulse D1 has a current value IB of 70 amps and a duration of 2 msec; and wait period DW1 has a duration of 4 msec.

A method of measuring the state of charge for batteries, at least for NiCad and NiFe batteries, is based upon the general waveform shown in FIG. 3. In this method, the open circuit battery voltage is measured and integrated during a wait period immediately following a discharging pulse, for example, wait period DW1, DW2, or DW3. The battery is deemed to be fully charged when the integrated voltage value rises to a certain point or when the integrated voltage value has reached a steady-state condition, that is, the value for the present measurement is the same or approximately the same as the integrated voltage value for the previous measurement. The area (A) of interest is the area under the open circuit voltage curve during a waiting period and, more particularly, is the area under the open circuit voltage curve above the minimum voltage (V7). In other words, the area under the curve where the voltage is in the range of V7 to V6. The area A is readily determined by, for example, measuring the entire area under the open circuit output voltage curve during the wait period and then subtracting the area represented by V7×T where V7 is the minimum voltage during the wait period and T the duration of the period of measurement of the area, such as the duration of the wait period. The measured area is compared with the area for the corresponding wait period following the next charging pulse. For example, the area associated with wait period DW1 following charging pulse C1 would be compared with the area associated with the wait period DW1 (not shown) following the charging pulse C1'. Likewise, the area associated with the wait period DW2 following charging pulse C1 would be compared with the area associated with the wait period DW2 (not shown) following the next charging pulse C1'. Likewise, the areas associated with wait periods DW3 may be compared, as may be subsequent discharging pulse wait periods (not shown) if four or more discharging pulses are used between charging pulses. Initially, the area A will be small and, as the battery becomes charged, the area will increase. The battery is deemed to be fully charged when the area reaches a predetermined value or reaches a steady state condition. For example, the battery would be deemed to be fully charged when the area associated with wait period DW1 following charging pulse C1 was approximately the same as the area associated with the wait period DW1 following the next charging pulse C1'.

The state of charge may also be determined by measuring the slope of the output voltage: $(V6-V7)/T$; where T is the time of measurement, such as the depolarization waiting time (DW). Initially, the slope will be shallow, as V7 is approximately the same as V6. As the battery charges, V7 will become noticeably less than V6 and the slope will approach some steady-state or maximum value. The battery is fully charged once the slope has reached a steady-state condition, that is, it has reached its maximum value and changes insignificantly from cycle to cycle, or is more than some predetermined value. The slope may also be used to determine an angle: $ARCTANGENT((V6-V7)/T)$. The battery is fully charged once the angle has reached a steady-state condition, that is, it has reached its maximum value and changes insignificantly from cycle to cycle, or is greater than some predetermined value.

When a battery, such as a lead acid battery, is first built, it requires formation (initial charging) in order to convert, for example, the lead sulfate to lead and lead peroxide. The electrolyte is placed into the battery and the initial chemical reaction will produce a large amount of heat. This may cause the battery temperature to easily reach 170° F. Once the plates have absorbed a substantial amount of electrolyte, then the temperature will begin to decrease. Once the internal temperature drops to approximately 140° F., then the initial charge should be applied to the battery. Initially, the resistance of the battery is very low due to a large number of free ions. The battery will therefore accept a large charging current. It is not desirable to force a large current through the battery at this time because the heat generated, in addition to the already high temperature, can damage the battery. Therefore, the duration, number and magnitude of the charging pulses should be varied in response to the temperature of the battery.

For a lead acid battery, using a single charging pulse and multiple discharging pulses, and maintaining the internal battery temperature at 140° F., the initial parameters for the waveform of FIG. 2 may be, for example, as follows: charging pulse C1 has a current value IA of 25 amps and a duration of 150 msec; wait period W1 has a duration of 1 msec; discharging pulses D1, D2 and D3 each have a current value IB of 25 amps and a duration of 1 msec; and wait periods DW1-DW3 each have a duration of 6 msec.

Temperature sensor 23 monitors the internal temperature of battery 11 and provides this information to controller 13 so that controller 13 can instruct charging circuit 15 to adjust the charging current amplitude or pulse width appropriately. Controller 13 may also monitor the current via resistor 20 and adjust the drive to charging circuit 15 so that the proper charging current is provided. The duration, number, and magnitude of the charging current pulses and the discharging current pulses should be established to maintain the battery temperature at approximately 140° F. degrees and to maintain optimum charging conditions. The waveform used for formatting the battery is also shown by FIG. 2. That is, one or more charging pulses C1, C2, separated and followed by wait periods CW1, CW2, followed by discharging pulses D1, D2, D3, which are also separated and followed by waiting periods DW1, DW2, DW3. The multiple discharging pulses again serve to control the size of the crystals and minimize the formation of sharp edges on the crystals.

Figure 4:
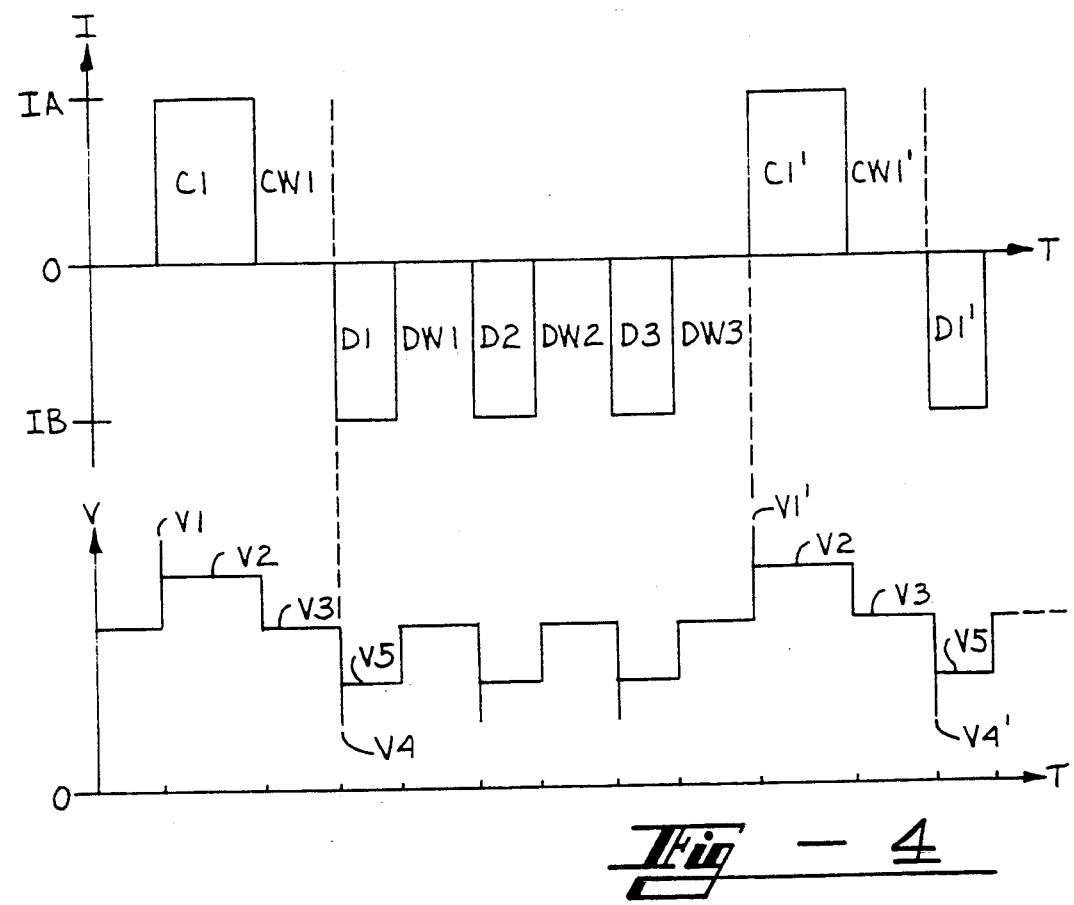
FIG. 4 is a waveform which illustrates how the state of formation of the battery is determined.

Turn now to FIG. 4 which is a waveform which illustrates how the state of formation of the battery is determined. During the formation process a voltage peak will occur at the beginning of a charging pulse C1 and a voltage dip will occur at the beginning of a discharging pulse D1-D3. For convenience, both the peaks and dips are referred to as spikes, the peaks such as V1 being positive-going spikes and the dips such as V4 being negative-going spikes. The voltage spikes which appear at the beginning of a charging pulse represent the state of formation of the negative plate of the battery and voltage spikes which appear at the beginning of a discharging pulse represent the state of formation of the positive plate of the battery. Typically, the negative plate is smaller than the positive plate and will be fully converted before the positive plate. The negative plate can be made smaller than the positive plate because the chemical reactions at the negative plate occur at a faster rate than those at the positive plate. When the material at the negative plate becomes fully converted, the voltage spike at the beginning of the charging pulse will reach a steady-state condition, that is, it will achieve its maximum amplitude and remain at this maximum amplitude. Similarly, when the material at the positive plate becomes fully converted, the voltage spike appearing at the beginning of the discharging pulse will reach a steady-state condition, that is, it will achieve its maximum amplitude and remain at this amplitude. The material at the negative plate converts faster than the positive plate so the voltage spike at the beginning of the charging pulse will reach maximum amplitude before the voltage spike at the beginning of the discharging pulse reaches maximum amplitude. It is desirable to fully format and charge both plates. If the discharge pulse is short, preferably less than 2-3 milliseconds, the negative plate will partially discharge, thereby producing water, but the positive plate will not discharge. Therefore, the application of discharging pulses allows the positive plate to be fully charged without overcharging the negative plate. The wait period after the discharge pulse allows time for the water to mix with the electrolyte and produce ions, which aid in the charging of the battery. The optimum wait period for lead-acid batteries is approximately 5-6 milliseconds. The waveforms shown are those which are obtained using a constant current source to provide the current IA for the charging pulse. The upper waveform of FIG. 4, which is the current waveform, illustrates a charging pulse C1, followed by a waiting period CW1, followed by a series of discharging pulses D1, D2 and D3, separated by waiting periods DW1 and DW2, and followed by waiting period DW3. The process then repeats beginning with the next charging pulse C1'. The lower waveform is the battery voltage waveform.

To cause current IA to flow during charging pulse C1, the charging circuit 15 must initially apply a large voltage V1 to the battery. Immediately thereafter, the battery will more readily accept the charging current and therefore the output voltage of charging circuit 15 will drop to voltage V2 and will remain at approximately this voltage for the remaining duration of the charging pulse C1. Upon termination of the charging pulse C1, charging circuit 15 and discharging circuit 16 will be deactivated so voltage V3 will represent the open circuit voltage of the battery 11. After wait period CW1 discharging circuit 16 will apply a load to battery 11 and the output voltage of battery 11 will drop to voltage V4. Immediately thereafter the battery will more readily provide the discharging current and therefore the output voltage of the battery will increase to voltage V5 and will remain at approximately this voltage for the remaining duration of the discharging pulse D1. At the end of discharging pulse D1, discharging circuit 16 will be turned off and the open circuit voltage of battery 11 will rise to no-load voltage V3 for the duration of the wait period DW1. After the completion of the wait period DW1, discharging pulse D2 will be applied and the battery voltage will again drop to approximately voltage V4 at the beginning of the discharge pulse, then rise to voltage V5 and remain at this voltage for the remaining duration of the discharge pulse, and then rise to open circuit voltage V3 for the next wait period DW2. The action is similar for discharging pulse D3, wait period DW3, and any additional discharging pulses or wait periods that may be present before the next charging pulse.

After a sufficient number of repetitions of applying charging pulses and discharging pulses to the battery, the material at one or both of the plates of the battery will become fully converted. When this occurs the battery will accept no additional charge and continued application of charging current will, in general, cause excessive electrolysis, gassing, and heating of the battery. Therefore, once the battery is fully formatted the charge/discharge process is discontinued and the battery may be placed into service or placed on a maintenance charge process, such as a trickle charge process. If the battery is fully formatted then, when the next charging pulse C1' is applied, or the next discharging pulse D1 through D3 is applied, the voltage at the beginning of a charging pulse and the voltage at the beginning of a discharging pulse will no longer change. The duration of voltage spikes V1 and V4 is typically in the order of one to two milliseconds. Controller 13 monitors the voltage across battery 11. Controller 13 will store the values V1 and V4 for the spike voltages for an arbitrary number of charging pulse/discharging pulse repetitions and store the average value. Controller 13 will then repeat this process and compare the newly averaged value against the originally averaged value. When the newly averaged value no longer changes, that is, the peaks no longer increase and the dips no longer decrease, the steady-state condition has been reached and controller 13 determines that the battery has been fully formatted and discontinues the application of charging pulses and discharging pulses. This method of determining the state of formation or charging of a battery by measuring the amplitude of the voltage spikes is usable for at least the following types of batteries: lead acid, NiCad, and NiFe.

The change in the magnitude of the voltage spikes at the beginning of a charging pulse and at the beginning of a discharging pulse is directly attributed to higher battery impedance at the beginning of the charging or discharging pulse. As material is converted at the positive and negative plates during the formation process, the plates will have an increasing electrical potential. This creates increasing attraction for oppositely charged ions, thereby creating the so-called Duffney layer. As this electrical potential increases, this Duffney layer becomes more difficult to break, thereby creating a higher battery impedance at the beginning of the charging pulse due to the necessity to break the Duffney layer at the negative plate and creating a higher battery impedance at the beginning of the discharging pulse due to the necessity to break the Duffney layer at the positive plate. Therefore, once substantially all the material at the positive and negative plates is converted and the formation process is complete, the electrical potential and impedance reach maximum values. This maximizes the voltage needed to break the Duffney layer.

For a lead acid battery, typical values for the charging pulse, discharging pulse, and waiting periods are as listed in conjunction with the description of FIG. 2, and typical voltage values are: V1−V2 is 5 volts; V5−V4 is 0.1 volts; V1'−V2 is 5.1 volts; and V5−V4' is 0.11 volts.

FIG. 5 is a flow chart of the battery charging process implemented by the controller 13. In step 41, controller 13 sets the initial parameters for the charging sequence based upon the user input, such as the battery type (lead acid, NiCad, NiFe, etc.), the battery voltage (nominal voltage, number of cells, volts per cell rating), battery capacity (amp-hours, maximum amps), battery model number, etc. In response to these user inputs controller 13 sets the number, duration, and amplitude of the charging pulses, the duration of the charging wait periods, the number, duration, and magnitude of the discharging pulses, and the duration of the discharging wait periods. In step 42 controller 13 executes the charging sequence: applying one or more charging pulses and charging wait periods, and then applying one or more discharging pulses and discharging wait periods. In step 43, controller 13 measures and processes the battery parameters, such as the battery voltage, battery temperature, and battery current. Although it is possible to measure these parameters on a pulse-by-pulse basis, the response time of the battery is generally very slow. Therefore, the values may be based upon the average value of that parameter for predetermined intervals, or that parameter may only be sampled at predetermined intervals, for example, for the past five seconds (such as for the battery voltage) to ten seconds (such as for the battery temperature). Therefore, numerous cycles of the charging sequence may be executed in step 42 before step 43 is executed or while step 43 is being executed.

Decisions 44 and 45 test whether the battery voltage and battery temperature are acceptable. If not then, in step 46, controller 13 adjusts the parameters. For example, if the battery voltage or the battery temperature is too high, then controller 13 may decrease the number, duration, and/or amplitude of the charging pulses. If the battery voltage or battery temperature is too low, then controller 13 may increase the number, duration, and/or amplitude of the charging pulses. Similarly, controller 13 may adjust the number, duration, and/or amplitude of the discharging pulses and the duration of the charging pulse wait periods and the discharging pulse wait periods in order to bring the battery voltage and battery temperature within the desired limits. After the parameters are adjusted in step 46, controller 13 then executes the next charging sequence in step 42.

Decision 47 tests whether the battery is charged (or formatted), using the spike voltage and/or area tests previously described. If the battery is not charged, then controller 13 will return to step 42. If the battery is fully charged, then controller 13 will switch to a maintenance procedure 50, which may consist of causing charging circuit 15 to apply a trickle charge to battery 11, sound an alarm, or indicate on display 14 that the process has been completed and the battery is fully charged or formatted.

Although particular steps are not shown, it will be appreciated that controller 13 will terminate the process if the charging current or temperature cannot be brought within acceptable limits or if an excessive amount of charging time has passed. In such a case controller 13 would sound an alarm and/or indicate on the display 14 the particular problem encountered.

Although the preferred embodiment adjusts the magnitude and duration of the charging and discharging pulses it will be appreciated that the duration of the wait periods may also be adjusted to achieve a particular result.

Although the present invention has been described with particularity for use with lead acid, nickel-cadmium, and nickel-iron batteries, the present invention is not so limited and is useful with other types of batteries as well, such as, but not limited to, nickel-hydride and zinc-air batteries.

It will be appreciated from the above that the present invention describes a method and an apparatus usable for rapidly charging and formatting a battery, for rapidly thawing and charging a frozen battery, for determining the state of formation of a battery, and for determining the state of charge of a battery. Although the present invention has been described with particularity it will be appreciated that variations thereof will be apparent to those of skill in the art. Therefore, the scope of the present invention is to be limited only by the claims below.

We claim:

1. A method for charging a battery, comprising the steps of:
   applying at least one charging pulse to said battery, said battery receiving a charging current primarily only during a said charging pulse, a said charging pulse having a pulse width not substantially less than 150 milliseconds;
   applying a first discharging pulse to said battery;
   waiting for a first wait period during which said battery is neither substantially charged nor substantially discharged;
   applying at least a second discharging pulse to said battery, said battery providing a discharging current primarily only during said discharging pulses; and
   repeating the above steps until a selected parameter has been achieved.

2. The method of claim 1 wherein said step of applying a discharge pulse comprises applying a load to said battery.

3. The method of claim 1 wherein said first discharging pulse has a first duration, said second discharging pulse has a second duration, and said first duration is approximately equal to said second duration.

4. The method of claim 1 wherein said charging pulse has a charging current amplitude and each of said discharge pulses has a discharge current amplitude, and wherein said discharge current amplitude of at least one of said discharge pulses is not less than said charging current amplitude.

5. The method of claim 1 and further comprising the step of waiting for a second wait period after applying said charging pulse before applying said first discharging pulse.

6. The method of claim 1 and further comprising the step of waiting for a second wait period after said second discharging pulse before repeating said above steps.

7. The method of claim 6 wherein said first wait period has a duration which is approximately equal to the duration of said second wait period.

8. The method of claim 1 wherein said selected parameter is a degree of charge for said battery and said method further comprises the step of measuring said degree of charge of said battery.

9. The method of claim 8 wherein said degree of charge is measured when said charging pulse is being applied.

10. The method of claim 9 wherein a said charging pulse causes a positive-going spike voltage to appear at said battery and said step of measuring said degree of charge comprises measuring said positive-going spike voltage of said battery.

11. The method of claim 10 wherein said positive-going spike voltage is measured at the beginning of a charging pulse.

12. The method of claim 10 wherein said step of measuring said degree of charge further comprises determining whether said positive-going spike voltage has reached a steady-state condition.

13. The method of claim 10 wherein said step of measuring said degree of charge further comprises measuring the peak amplitude of the voltage of said battery during a wait period after a discharge pulse.

14. The method of claim 8 wherein said degree of charge is measured when a said discharging pulse is being applied.

15. The method of claim 14 wherein a said discharging pulse causes a negative-going spike voltage to appear at said battery and said step of measuring said degree of charge comprises measuring said negative-going spike voltage of said battery.

16. The method of claim 15 wherein said negative-going spike voltage is measured at the beginning of a discharging pulse.

17. The method of claim 15 wherein said step of measuring said degree of charge further comprises determining whether said negative-going spike voltage has reached a steady-state condition.

18. The method of claim 8 wherein said degree of charge is measured during a wait period following a said discharging pulse.

19. The method of claim 18 wherein said step of measuring said degree of charge comprises:
measuring the amplitude of the voltage of said battery to provide an amplitude measurement; and
integrating said amplitude measurement over a predetermined portion of said wait period to provide an integrated amplitude signal; and
evaluating said integrated amplitude signal.

20. The method of claim 19 wherein said step of applying a discharge pulse comprises applying a load to said battery.

21. The method of claim 19 wherein said step of measuring said degree of charge further comprises determining whether said integrated amplitude signal has reached a steady-state condition.

22. The method of claim 18 wherein said step of measuring said degree of charge comprises measuring the rate of change of the voltage of said battery within a predetermined portion of said wait period.

23. The method of claim 22 wherein said step of measuring said degree of charge further comprises determining whether said rate of change has reached a steady-state condition.

24. An apparatus for charging a battery, comprising:
charging means for applying a charging pulse to said battery, said battery receiving a charging current primarily only during a said charging pulse, said charging pulse having a pulse width not substantially less than 150 milliseconds;
discharging means for applying a discharging pulse to said battery, said battery providing a discharging current primarily only during said discharging pulse; and
control means, including timing means, for repeatedly: causing said charging means to apply at least a first charging pulse, causing said discharging means to apply a first discharging pulse, waiting for a wait period during which said battery is neither substantially charged nor substantially discharged, and causing said discharging means to apply at least a second discharging pulse.

25. The apparatus of claim 24 wherein said control means waits a second wait period after said second discharging pulse before causing said charging means to apply a next said first charging pulse.

26. The apparatus of claim 24 wherein said control means waits a second wait period after said first charging pulse and then causes said charging means to apply a second charging pulse before causing said discharging means to apply said first discharging pulse.

27. The apparatus of claim 24 wherein said control means monitors a predetermined parameter of said battery.

28. The apparatus of claim 27 wherein said predetermined parameter is the temperature of said battery and said control means adjusts at least one of the following in response to said temperature: the duration of said charging pulse; the number of charging pulses; the duration of said discharging pulses; the number of discharging pulses; the duration of said wait period; the magnitude of said charging pulse; the magnitude of a said discharging pulse.

29. The apparatus of claim 27 wherein said predetermined parameter is the battery voltage and said control means adjusts at least one of the following in response to said battery voltage: the duration of said charging pulse; the number of charging pulses; the duration of said discharging pulses; the number of discharging pulses; the duration of said wait period; the magnitude of said charging pulse; the magnitude of a said discharging pulse.

30. The apparatus of claim 27 wherein a said charging pulse causes a positive-going spike voltage to appear at said battery, said predetermined parameter is said positive-going spike voltage and said control means terminates said charging of said battery in response to said positive-going spike voltage reaching a steady-state condition.

31. The apparatus of claim 27 wherein a said discharging pulse causes a negative-going spike voltage to appear at said battery, said predetermined parameter is said negative-going spike voltage and said control means terminates said charging of said battery in response to said negative-going spike voltage reaching a steady-state condition.

32. The apparatus of claim 27 wherein said predetermined parameter is the integral of the battery voltage measured during a predetermined portion of a said wait period following a said discharging pulse and said control means terminates said charging of said battery in response to said integral reaching a steady-state condition.

33. The apparatus of claim 27 wherein said predetermined parameter is the slope of the battery voltage measured during a predetermined portion of a said wait period following a said discharging pulse and said control means terminates said charging of said battery in response to said slope reaching a steady-state condition.

34. A method for determining the condition of a battery, comprising the steps of:
applying a charging pulse to said battery, said charging pulse causing a positive-going spike voltage to appear at said battery;
measuring said positive-going spike voltage of said battery during said charging pulse; and
evaluating said spike voltage.

35. The method of claim 34 wherein said step of monitoring comprises measuring said spike voltage at the beginning of said charging pulse.

36. The method of claim 34 wherein said step of evaluating comprises comparing said spike voltage to said spike voltage measured during a previous charging pulse.

37. The method of claim 34 wherein said step of evaluating comprises determining the difference between said spike voltage for a current charging pulse and said spike voltage for a previous charging pulse.

38. The method of claim 37 and further comprising the step of indicating said battery to be formatted when said difference is less than a predetermined value.

39. The method of claim 37 and further comprising the step of indicating said battery to be charged when said difference is less than a predetermined value.

40. The method of claim 37 and further comprising the step of indicating a negative plate of said battery to be formatted when said difference is less than a predetermined value.

41. The method of claim 37 and further comprising the step of indicating a negative plate of said battery to be charged when said difference is less than a predetermined value.

42. The method of claim 34 and further comprising the step of indicating said battery to be formatted when said spike voltage reaches a steady-state condition.

43. The method of claim 34 and further comprising the step of indicating said battery to be charged when said spike voltage reaches a steady-state condition.

44. A method for determining the condition of a battery, comprising the steps of:
applying a charging pulse to said battery;
applying a discharging pulse to said battery, said discharging pulse causing a negative-going spike voltage to appear at said battery;
measuring said negative-going spike voltage of said battery during said discharging pulse; and
evaluating said spike voltage.

45. The method of claim 44 wherein said step of measuring comprises measuring said spike voltage at the beginning of said discharging pulse.

46. The method of claim 44 wherein said step of evaluating comprises comparing said spike voltage to said spike voltage measured during a previous said discharging pulse.

47. The method of claim 44 wherein said step of evaluating comprises determining the difference between said spike voltage for a current discharging pulse and said spike voltage for a previous said discharging pulse.

48. The method of claim 47 and further comprising the step of indicating said battery to be formatted when said difference is less than a predetermined value.

49. The method of claim 47 and further comprising the step of indicating said battery to be charged when said difference is less than a predetermined value.

50. The method of claim 47 and further comprising the step of indicating a positive plate of said battery to be formatted when said difference is less than a predetermined value.

51. The method of claim 47 and further comprising the step of indicating a positive plate of said battery to be charged when said difference is less than a predetermined value.

52. The method of claim 44 and further comprising the step of indicating said battery to be formatted when said spike voltage reaches a steady-state condition.

53. The method of claim 44 and further comprising the step of indicating said battery to be charged when said spike voltage reaches a steady-state condition.

54. A method for determining the condition of a battery, comprising the steps of:
applying a charging pulse to said battery;
applying a discharging pulse to said battery;
waiting for a predetermined wait period; and
measuring the output voltage of said battery during a portion of said wait period to provide a voltage measurement;
determining the slope of said output voltage within said portion of said wait period to provide a voltage slope measurement; and
evaluating said voltage slope measurement.

55. The method of claim 54 wherein said step of evaluating further comprises declaring said battery to be charged when said slope reaches a steady-state condition.

56. The method of claim 54 and further comprising the step of comparing said slope to a reference value.

57. The method of claim 56 wherein said reference value is the slope of said output voltage for a previous wait period.

58. The method of claim 56 and further comprising the step of declaring said battery to be charged when the magnitude of said slope is greater than said reference value.

* * * * *